Patented Oct. 7, 1924.

1,510,591

UNITED STATES PATENT OFFICE.

FREDERICK W. FARRELL, OF BROOKFIELD, MASSACHUSETTS, ASSIGNOR, BY MESNE ASSIGNMENTS, TO McLAURIN-JONES CO., OF BROOKFIELD, MASSACHUSETTS, A CORPORATION OF MASSACHUSETTS.

ADHESIVE.

No Drawing. Application filed June 17, 1918, Serial No. 240,449. Renewed March 28, 1922. Serial No. 547,544.

*To all whom it may concern:*

Be it known that I, FREDERICK W. FARRELL, a citizen of the United States, and a resident of Brookfield, county of Worcester, and State of Massachusetts, have invented an Improved Adhesive, of which the following is a specification.

This invention has reference to improvements in adhesive and particularly in adhesive which is practically insoluble in water at moderate temperatures.

The object of this invention is to provide a novel adhesive which is non-tacky at ordinary temperatures and is water repellant or resisting but which adhesive may be readily rendered soft and tacky by subjecting the same to heat; said adhesive having a tensile strength which is retained after the adhesive has been applied under heat and has become set.

Another object of the invention is to provide a novel melting adhesive, so called, having considerable elasticity.

Other objects of the invention will appear from the following description.

The invention consists in the improved adhesive comprising the asphalt compounded with suitable oil and supplied with elastic material.

The invention also consists in the novel adhesive as hereinafter described and claimed.

The improved adhesive is adapted to be used for any or all of the purposes for which adhesive rendered tacky by moisture is adapted and is also desirable in uses where the presence of moisture is objectionable for any reason. The improved adhesive has been found to be useful when applied to strips of material to be used as veneer tapes, so called, whereby pieces of wood veneer having their edges abutting can be secured together until the surfaces of said veneer are secured to a core or base. In structures built up from a series of superposed layers or sheets of wood veneer the use of veneer tape having adhesive rendered tacky by moisture is objectionable owing to the delay required in drying said veneer and also from the fact that said ordinary adhesive is non-elastic when dry and, when it remains in the built up structure, tends to weaken the joint between the superposed layers. The improved adhesive is particularly adapted for this purpose as its moisture resisting quality tends to protect the joints between the pieces of veneer against the entrance of moisture and the elasticity of the improved adhesive adds to the elasticity of the built up structure.

In carrying this invention into practice I prepare the improved adhesive by taking refined asphalt, mineral oil and gutta percha, rubber, balata or other elastic material and compound the same under a suitable temperature. More specifically, I use eighty parts, by weight, of refined asphalt mixed with sixteen parts of blown mineral oil in any ordinary asphalt compounding machine. I prefer to make use of the blown mineral oil in view of the fact of the increased amount of oxygen in the blown oil and the consequent breaking up of the unsaturated bonds of the hydrocarbon chain whereby the oil becomes oxidized. After the thorough mixing of the asphalt and blown mineral oil I add thereto gutta percha and balata using approximately three parts of gutta percha and one part of balata gum which latter adds toughness and tensile strength to the gutta percha. In some cases however and particularly when rubber is substituted for the gutta percha I may omit the balata gum. After the addition of the rubbery matter, gutta percha, balata gum, or rubber, as the case may be, I heat the same to a suitable temperature to dissolve the rubbery matter without carbonizing or otherwise injuring any of the ingredients.

The resulting adhesive may be utilized at a suitable temperature in any known manner and may be applied as a coating to paper or other material which may be used as adhesive sheets or may be cut into tapes which are supplied with heat at or about the time of their application to veneers or to any other material or articles. After the application of the adhesive its cohesion to the material or article to which it is applied is increased by the setting of the adhesive as its temperature is reduced but the combination of the asphalt, oxidized or blown oil and rubbery matter prevents undue crystallization of any of the ingredients and, hence, the tensile strength of the adhesive is not diminished by such setting, nor does the adhesive yield readily to moisture.

In some uses of the improved adhesive as, for instance, when it is applied as a coating to tissue paper or other thin or delicate material I prefer to add to the adhesive material above described a suitable proportion of turpentine, benzine, benzol, carbon bisulphid, carbon tetrachlorid or other solvent for said adhesive material or a combination of such solvents in order to render the adhesive more fluid and thus facilitate its application to the thin or delicate material.

Having thus described my invention I claim as new and desire to secure by Letters Patent.

1. An adhesive of the nature described comprising refined asphalt, oxidized mineral oil and a suitable rubbery material.

2. An adhesive of the nature described comprising refined asphalt, blown mineral oil, and gutta percha.

3. An adhesive of the nature described, comprising substantially eighty parts of refined asphalt, sixteen parts of blown mineral oil, three parts of gutta percha, and one part of balata gum.

4. An adhesive of the nature described, comprising a predominating percentage of asphalt, a substantial percentage of blown mineral oil, and a small percentage of a rubbery material.

5. That improvement in the process of manufacturing adhesives which consists in mixing together approximately eighty parts of refined asphalt and sixteen parts of blown mineral oil, adding thereto approximately four parts of a rubbery material, and then heating the mixture to a temperature sufficient to dissolve the rubbery material but preventing a rise in temperature to a point sufficient to carbonize the ingredients.

FREDERICK W. FARRELL.